(12) United States Patent
Teramae

(10) Patent No.: US 10,078,484 B2
(45) Date of Patent: Sep. 18, 2018

(54) MULTIVISION DISPLAY CONTROL DEVICE AND MULTIVISION SYSTEM

(71) Applicant: Mitsubishi Electric Corporation, Tokyo (JP)

(72) Inventor: Sanae Teramae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/510,978

(22) Filed: Oct. 9, 2014

(65) Prior Publication Data

US 2015/0138040 A1 May 21, 2015

(30) Foreign Application Priority Data

Nov. 21, 2013 (JP) ................................. 2013-240624

(51) Int. Cl.
  *G06F 3/14* (2006.01)
  *H04N 5/262* (2006.01)

(52) U.S. Cl.
  CPC ....... *G06F 3/1446* (2013.01); *G09G 2340/04* (2013.01); *G09G 2340/125* (2013.01); *G09G 2370/20* (2013.01); *H04N 5/2624* (2013.01)

(58) Field of Classification Search
  None
  See application file for complete search history.

(56) References Cited

U.S. PATENT DOCUMENTS

| 4,712,191 | A | * | 12/1987 | Penna | ................. G06F 3/04842 345/173 |
|---|---|---|---|---|---|
| 5,600,346 | A | | 2/1997 | Kamata et al. | |
| 7,250,978 | B2 | | 7/2007 | Lee et al. | |
| 8,482,672 | B2 | | 7/2013 | Yuki | |
| 8,712,080 | B2 | | 4/2014 | Tani et al. | |
| 8,724,027 | B2 | | 5/2014 | Yuki | |
| 8,988,314 | B2 | | 3/2015 | Akitomo | |
| 2004/0027482 | A1 | * | 2/2004 | Lee | .......................... H04N 9/12 348/383 |

(Continued)

FOREIGN PATENT DOCUMENTS

CN    1474596 A    2/2004
CN    101897178 A    11/2010

(Continued)

*Primary Examiner* — David Donald Davis
(74) *Attorney, Agent, or Firm* — Birch, Stewart, Kolasch & Birch, LLP

(57) ABSTRACT

An operating section receives a first operation relating to a group display position that is a position of display videos formed by a plurality of videos belonging to a video group on a multivision screen, and a group display size that is a size of the display videos. A display controller determines video display positions that are positions of the plurality of videos on the plurality of display screens and video display sizes that are sizes of the videos based on the group display position and the group display size, display information including sizes and positions of a plurality of display screens, and a relative position and a relative size of the plurality of videos in the video groups, generates video signals for the plurality of displays based on the video display positions and the video display sizes, and outputs the video signals to the plurality of displays.

9 Claims, 15 Drawing Sheets

(56) References Cited

U.S. PATENT DOCUMENTS

| | | | |
|---|---|---|---|
| 2005/0134525 A1* | 6/2005 | Tanghe | G06F 3/1446 345/1.1 |
| 2010/0265401 A1* | 10/2010 | Yuki | H04N 21/488 348/565 |
| 2011/0162031 A1* | 6/2011 | Weon | H04N 21/4122 725/137 |
| 2011/0293122 A1* | 12/2011 | Tani | H04R 1/028 381/306 |
| 2012/0242893 A1* | 9/2012 | Akitomo | G06F 3/1446 348/441 |
| 2013/0321703 A1 | 12/2013 | Yuki | |
| 2014/0140415 A1* | 5/2014 | Choe | H04N 21/23439 375/240.25 |

FOREIGN PATENT DOCUMENTS

| | | |
|---|---|---|
| CN | 102332240 A | 1/2012 |
| CN | 102695033 A | 9/2012 |
| JP | 7-191820 A | 7/1995 |
| JP | 7-92658 B2 | 10/1995 |
| JP | H09-274553 A | 10/1997 |
| JP | 2008-154054 A | 7/2008 |
| JP | 2009-193451 A | 8/2009 |
| JP | 4628348 B2 | 2/2011 |
| JP | 2013-003420 A | 1/2013 |

* cited by examiner

FIG. 2
| DISPLAY NUMBER | DISPLAY POSITION (DPx1, DPy1) | DISPLAY SIZE (DSx1 × DSy1) |
|---|---|---|
| 1 | (0, 0) | 1920 × 1080 |
| 2 | (1920, 0) | 1920 × 1080 |
| 3 | (0, 1080) | 1920 × 1080 |
| 4 | (1920, 1080) | 1920 × 1080 |
FIG. 3
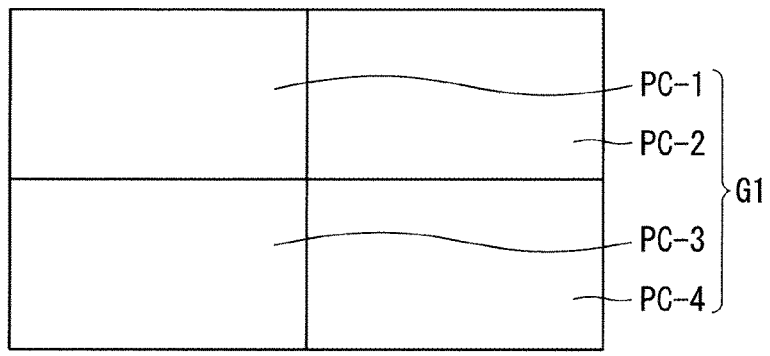
FIG. 4
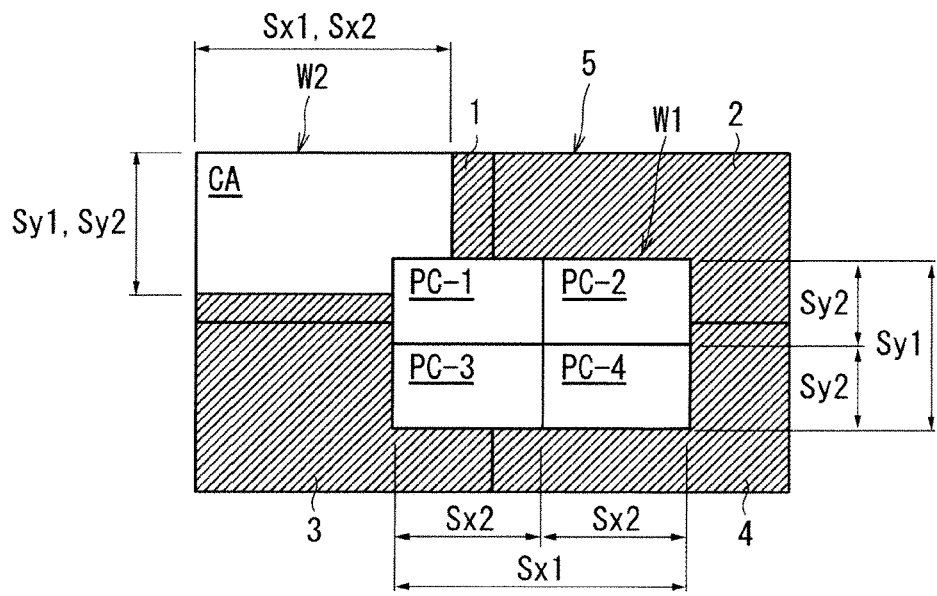

FIG. 5

| SOURCE NUMBER | WINDOW NAME | SOURCE RESOLUTION | DESCRIPTION ABOUT VIDEO |
|---|---|---|---|
| 1 | PC-1 | 1920 × 1080 | DESK TOP VIDEO 1 DIVIDED INTO FOUR |
| 2 | PC-2 | 1920 × 1080 | DESK TOP VIDEO 2 DIVIDED INTO FOUR |
| 3 | PC-3 | 1920 × 1080 | DESK TOP VIDEO 3 DIVIDED INTO FOUR |
| 4 | PC-4 | 1920 × 1080 | DESK TOP VIDEO 4 DIVIDED INTO FOUR |
| 5 | CA | 1600 × 900 | IMAGED VIDEO OF CAMERA 12 |
| 6 | CB | 800 × 600 | IMAGED VIDEO OF CAMERA 13 |

FIG. 6

| GROUP NUMBER | SOURCE RELATIVE POSITION | | | PRESENCE/ NON-PRESENCE OF GROUP DISPLAY | GROUP DISPLAY POSITION (Px1, Py1) | GROUP DISPLAY SIZE (Sx1 × Sy1) | GROUP OVERLAPPING ORDER |
|---|---|---|---|---|---|---|---|
| | SOURCE ARRANGEMENT NUMBER (Nx × Ny) | SOURCE ARRANGEMENT POSITION | SOURCE NUMBER | | | | |
| 1 | 2 × 2 | (1, 1) | 1 | PRESENT | (1500, 700) | 1920 × 1080 | 1 |
| | | (2, 1) | 2 | | | | |
| | | (1, 2) | 3 | | | | |
| | | (2, 2) | 4 | | | | |
| 2 | 1 × 1 | (1, 1) | 5 | PRESENT | (0, 0) | 1600 × 900 | 2 |
| 3 | 1 × 1 | (1, 1) | 6 | NOT PRESENT | - | - | - |

| SOURCE NUMBER | DISPLAY POSITION ON VISION (Px2, Py2) | VIDEO DISPLAY SIZE (Sx2 × Sy2) |
|---|---|---|
| 1 | (1500, 700) | 960 × 540 |
| 2 | (2460, 700) | 960 × 540 |
| 3 | (1500, 1240) | 960 × 540 |
| 4 | (2460, 1240) | 960 × 540 |

| SOURCE NUMBER | DISPLAY POSITION ON VISION (Px2, Py2) | VIDEO DISPLAY SIZE (Sx2 × Sy2) |
|---|---|---|
| 5 | (0, 0) | 1600 × 900 |

FIG. 14

| DISPLAY NUMBER | SOURCE NUMBER |
|---|---|
| 1 | 1 |
| 1 | 5 |
| 2 | 1 |
| 2 | 2 |
| 3 | 1 |
| 3 | 3 |
| 4 | 1 |
| 4 | 2 |
| 4 | 3 |
| 4 | 4 |

FIG. 15

| DISPLAY NUMBER | SOURCE NUMBER | DISPLAY POSITION ON DISPLAY (Px3, Py3) | VIDEO DISPLAY SIZE | SOURE OVERLAPPING ORDER |
|---|---|---|---|---|
| 1 | 1 | (1500, 700) | 960 × 540 | 1 |
| 1 | 5 | (0, 0) | 1600 × 900 | 2 |
| 2 | 1 | (−420, 700) | 960 × 540 | 1 |
| 2 | 2 | (540, 700) | 960 × 540 | 2 |
| 3 | 1 | (1500, −380) | 960 × 540 | 1 |
| 3 | 3 | (1500, 160) | 960 × 540 | 2 |
| 4 | 1 | (−420, −380) | 960 × 540 | 1 |
| 4 | 2 | (540, −380) | 960 × 540 | 2 |
| 4 | 3 | (−420, 160) | 960 × 540 | 3 |
| 4 | 4 | (540, 160) | 960 × 540 | 4 |

| GROUP NUMBER | SOURCE RELATIVE POSITION | | | PRESENCE/ NON-PRESENCE OF GROUP DISPLAY | GROUP DISPLAY POSITION (Px1, Py1) | GROUP DISPLAY SIZE (Sx1 × Sy1) | GROUP OVERLAPPING ORDER |
|---|---|---|---|---|---|---|---|
| | SOURCE ARRANGEMENT NUMBER (Nx × Ny) | SOURCE ARRANGEMENT POSITION | SOURCE NUMBER | | | | |
| 1 | 2 × 2 | (1, 1) | 1 | NOT PRESENT | - | - | - |
| | | (2, 1) | 2 | | | | |
| | | (1, 2) | 3 | | | | |
| | | (2, 2) | 4 | | | | |
| 2 | 1 × 1 | (1, 1) | 5 | NOT PRESENT | - | - | - |
| 3 | 1 × 1 | (1, 1) | 6 | NOT PRESENT | - | - | - |

FIG. 18

| GROUP NUMBER | SOURCE RELATIVE POSITION | | | PRESENCE/ NON-PRESENCE OF GROUP DISPLAY | GROUP DISPLAY POSITION (Px1, Py1) | GROUP DISPLAY SIZE (Sx1 × Sy1) | GROUP OVERLAPPING ORDER |
|---|---|---|---|---|---|---|---|
| | SOURCE ARRANGEMENT NUMBER (Nx × Ny) | SOURCE ARRANGEMENT POSITION | SOURCE NUMBER | | | | |
| 1 | 2 × 2 | (1, 1) | 1 | PRESENT | (0, 0) | 3840 × 2160 | 1 |
| | | (2, 1) | 2 | | | | |
| | | (1, 2) | 3 | | | | |
| | | (2, 2) | 4 | | | | |
| 2 | 1 × 1 | (1, 1) | 5 | NOT PRESENT | – | – | – |
| 3 | 1 × 1 | (1, 1) | 6 | NOT PRESENT | – | – | – |

FIG. 19

| SOURCE NUMBER | DISPLAY POSITION ON VISION (Px2, Py2) | VIDEO DISPLAY SIZE (Sx2 × Sy2) |
|---|---|---|
| 1 | (0, 0) | 1920 × 1080 |
| 2 | (1920, 0) | 1920 × 1080 |
| 3 | (0, 1080) | 1920 × 1080 |
| 4 | (1920, 1080) | 1920 × 1080 |

FIG. 20

| DISPLAY NUMBER | SOURCE NUMBER |
|---|---|
| 1 | 1 |
| 2 | 2 |
| 3 | 3 |
| 4 | 4 |

FIG. 21

| DISPLAY NUMBER | SOURCE NUMBER | DISPLAY POSITION ON DISPLAY (Px3, Py3) | DISPLAY SIZE | SORUCE OVERLAPPING ORDER |
|---|---|---|---|---|
| 1 | 1 | (0, 0) | 1920 × 1080 | 1 |
| 2 | 2 | (0, 0) | 1920 × 1080 | 1 |
| 3 | 3 | (0, 0) | 1920 × 1080 | 1 |
| 4 | 4 | (0, 0) | 1920 × 1080 | 1 |

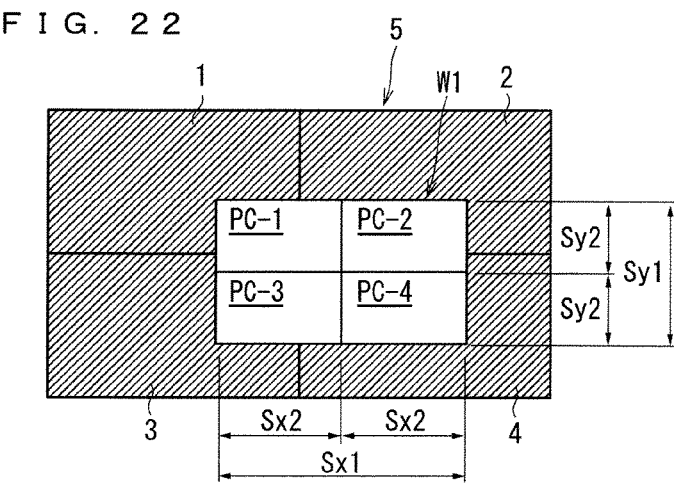

| GROUP NUMBER | SOURCE RELATIVE POSITION | | | PRESENCE/ NON-PRESENCE OF GROUP DISPLAY | GROUP DISPLAY POSITION (Px1, Py1) | GROUP DISPLAY SIZE (Sx1 × Sy1) | GROUP OVERLAPPING ORDER |
|---|---|---|---|---|---|---|---|
| | SOURCE ARRANGEMENT NUMBER (Nx × Ny) | SOURCE ARRANGEMENT POSITION | SOURCE NUMBER | | | | |
| 1 | 2 × 2 | (1, 1) | 1 | PRESENT | (1500, 700) | 1920 × 1080 | 1 |
| | | (2, 1) | 2 | | | | |
| | | (1, 2) | 3 | | | | |
| | | (2, 2) | 4 | | | | |
| 2 | 1 × 1 | (1, 1) | 5 | NOT PRESENT | – | – | – |
| 3 | 1 × 1 | (1, 1) | 6 | NOT PRESENT | – | – | – |

FIG. 24

| DISPLAY NUMBER | SOURCE NUMBER |
|---|---|
| 1 | 1 |
| 2 | 1 |
| 2 | 2 |
| 3 | 1 |
| 3 | 3 |
| 4 | 1 |
| 4 | 2 |
| 4 | 3 |
| 4 | 4 |

FIG. 25

| DISPLAY NUMBER | SOURCE NUMBER | DISPLAY POSITION ON DISPLAY (Px3, Py3) | DISPLAY SIZE | SORUCE OVERLAPPING ORDER |
|---|---|---|---|---|
| 1 | 1 | (1500, 700) | 960 × 540 | 1 |
| 2 | 1 | (-420, 700) | 960 × 540 | 1 |
| 2 | 2 | (540, 700) | 960 × 540 | 2 |
| 3 | 1 | (1500, -380) | 960 × 540 | 1 |
| 3 | 3 | (1500, 160) | 960 × 540 | 2 |
| 4 | 1 | (-420, -380) | 960 × 540 | 1 |
| 4 | 2 | (540, -380) | 960 × 540 | 2 |
| 4 | 3 | (-420, 160) | 960 × 540 | 3 |
| 4 | 4 | (540, 160) | 960 × 540 | 4 |

| GROUP NUMBER | SOURCE RELATIVE POSITION | | | PRESENCE/ NON-PRESENCE OF GROUP DISPLAY | GROUP DISPLAY POSITION (Px1, Py1) | GROUP DISPLAY SIZE (Sx1 × Sy1) | GROUP OVERLAPPING ORDER |
|---|---|---|---|---|---|---|---|
| | SOURCE ARRANGEMENT NUMBER (Nx × Ny) | SOURCE ARRANGEMENT POSITION | SOURCE NUMBER | | | | |
| 1 | 2×2 | (1, 1) | 1 | PRESENT | (1500, 700) | 1920 × 1080 | 2 |
| | | (2, 1) | 2 | | | | |
| | | (1, 2) | 3 | | | | |
| | | (2, 2) | 4 | | | | |
| 2 | 1×1 | (1, 1) | 5 | PRESENT | (0, 500) | 1600 × 900 | 1 |
| 3 | 1×1 | (1, 1) | 6 | NOT PRESENT | – | – | – |

FIG. 28

| SOURCE NUMBER | DISPLAY POSITION ON VISION (Px2, Py2) | VIDEO SIZE (Sx2 × Sy2) |
|---|---|---|
| 5 | (0, 500) | 1600 × 900 |

FIG. 29

| DISPLAY NUMBER | SOURCE NUMBER | DISPLAY POSITION ON DISPLAY (Px3, Py3) | DISPLAY SIZE | SORUCE OVERLAPPING ORDER |
|---|---|---|---|---|
| 1 | 1 | (1500, 700) | 960 × 540 | 2 |
| 1 | 5 | (0, 500) | 1600 × 900 | 1 |
| 2 | 1 | (−420, 700) | 960 × 540 | 1 |
| 2 | 2 | (540, 700) | 960 × 540 | 2 |
| 3 | 1 | (1500, −380) | 960 × 540 | 2 |
| 3 | 3 | (1500, 160) | 960 × 540 | 3 |
| 3 | 5 | (0, −580) | 1600 × 900 | 1 |
| 4 | 1 | (−420, −380) | 960 × 540 | 1 |
| 4 | 2 | (540, −380) | 960 × 540 | 2 |
| 4 | 3 | (−420, 160) | 960 × 540 | 3 |
| 4 | 4 | (540, 160) | 960 × 540 | 4 |

FIG. 30

| GROUP NUMBER | SOURCE RELATIVE POSITION | | | PRESENCE/ NON-PRESENCE OF GROUP DISPLAY | GROUP DISPLAY POSITION (Px1, Py1) | GROUP DISPLAY SIZE (Sx1 × Sy1) | GROUP OVERLAPPING ORDER |
|---|---|---|---|---|---|---|---|
| | SOURCE ARRANGEMENT NUMBER (Nx × Ny) | SOURCE ARRANGEMENT POSITION | SOURCE NUMBER | | | | |
| 1 | 2 × 2 | (1, 1) | 1 | PRESENT | (1500, 700) | 1920 × 1080 | 1 |
| | | (2, 1) | 2 | | | | |
| | | (1, 2) | 3 | | | | |
| | | (2, 2) | 4 | | | | |
| 2 | 1 × 1 | (1, 1) | 5 | PRESENT | (0, 500) | 1600 × 900 | 2 |
| 3 | 1 × 1 | (1, 1) | 6 | NOT PRESENT | – | – | – |

FIG. 31

| DISPLAY NUMBER | SOURCE NUMBER | DISPLAY POSITION ON DISPLAY (Px3, Py3) | DISPLAY SIZE | SORUCE OVERLAPPING ORDER |
|---|---|---|---|---|
| 1 | 1 | (1500, 700) | 960 × 540 | 1 |
| 1 | 5 | (0, 500) | 1600 × 900 | 2 |
| 2 | 1 | (-420, 700) | 960 × 540 | 1 |
| 2 | 2 | (540, 700) | 960 × 540 | 2 |
| 3 | 1 | (1500, -380) | 960 × 540 | 1 |
| 3 | 3 | (1500, 160) | 960 × 540 | 2 |
| 3 | 5 | (0, -580) | 1600 × 900 | 3 |
| 4 | 1 | (-420, -380) | 960 × 540 | 1 |
| 4 | 2 | (540, -380) | 960 × 540 | 2 |
| 4 | 3 | (-420, 160) | 960 × 540 | 3 |
| 4 | 4 | (540, 160) | 960 × 540 | 4 |

F I G. 3 4
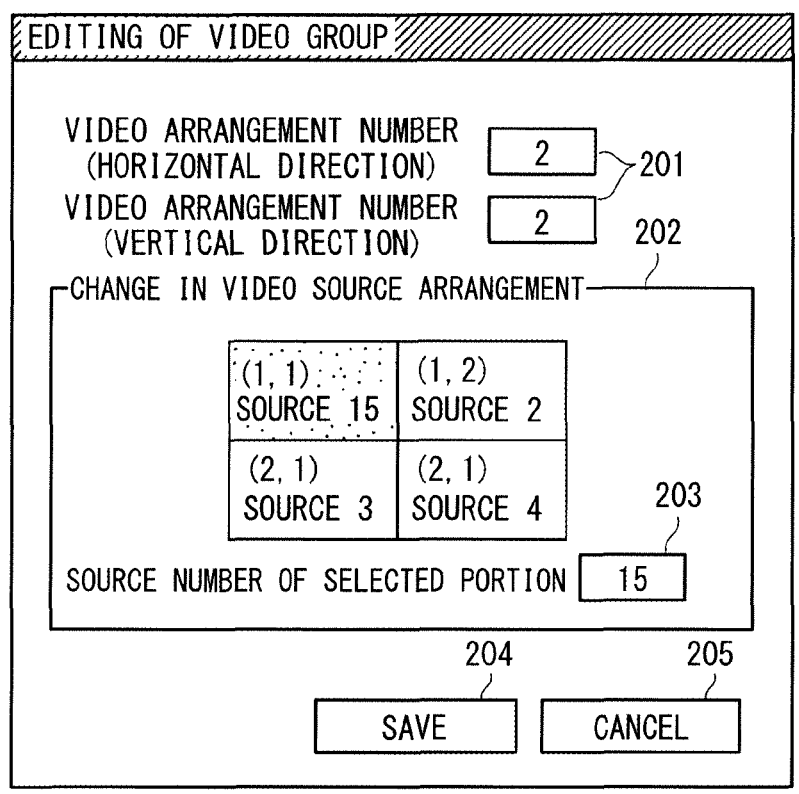

MULTIVISION DISPLAY CONTROL DEVICE AND MULTIVISION SYSTEM

BACKGROUND OF THE INVENTION

Field of the Invention

The present invention relates to a multivision display control device and a multivision system.

Description of the Background Art

A multivision system, in which a plurality of displays are arranged in a lattice pattern, for example, so as to compose one display screen, is widely utilized as a video display device to be used for monitoring in an infrastructure field such as electric power, traffic or plant.

The multivision system displays a plurality of videos including map information, videos captured by a camera and a data display application screen or the like on the display screen. Therefore, in general, sizes and positions of the plurality of videos are determined by a video signal processing apparatus, and one or a plurality of videos is selected from input video signals so as to be output to a multivision.

As the video signal processing apparatus that realizes such a function, for example, as described in Japanese Patent No. 4628348, a multivision processor device, which can display input videos on any positions and with any sizes on a plurality of displays, is known (see Japanese Patent No. 4628348).

In recent years, resolution of a video to be displayed in the multivision system is being heightened. However, the introduction of the system has a problem such that a multivision processor device that is compatible with limitation of a length of a video transmission cable and high resolution input is very expensive.

In order to solve this problem, a high resolution video is divided into a plurality of low resolution videos, and the videos after division (divided videos) are input into an inexpensive multivision processor device that is compatible with only low resolution, so that the divided videos are displayed side by side. As a result, a desired high resolution video can be displayed on a multivision.

However, in a conventional multivision processor device, a user performs an operation on all the individual divided videos in such cases that the divided videos are temporarily displayed or not displayed, and moved, their sizes are changed, and an order of overlapping with another video is changed.

In this case, for example, in the moving and size changing operations, the divided videos should be arranged while being adjusted so as to be adjacent to each other without another video, and thus time and effort are necessary.

When contents to be displayed and an arrangement of videos are changed according to conditions of a subject to be monitored as the utilization form of the multivision system that is used for monitoring applications, a big problem is such that input videos cannot be easily switched between display and non-display nor moved, and their sizes cannot be easily changed.

Further, display resolution of a display on which a video is displayed is being heightened, and thus much more videos than before can be displayed and arranged on a multivision. Also when the many videos are desired to be arranged into a lattice pattern, a user arranges the videos one by one while adjusting positions and sizes of the respective videos.

SUMMARY OF THE INVENTION

It is an object of the present invention to provide a multivision display control device that can easily display a plurality of videos thorough an operation on video display positions and video display sizes of a group of videos including the plurality of videos.

The multivision display device of the present invention has a plurality of display devices having respective display screens, and controls a multivision device in which a multivision screen is formed on display screens. The multivision display device includes an operating section and a display controller. The operating section is configured to receive a first operation about a group display position that is a position of a first display video on the multivision screen, and a group display size that is a size of the first display video. The first display video is formed by a plurality of videos belonging to a first video group. The display controller is configured to determine video display positions that are positions of the plurality of videos on the display screens, and video display sizes that are sizes of the plurality of videos based on the group display position and the group display size, display information including sizes and positions of the individual display screens of the plurality of display screen, and a relative position and a relative size of the plurality of videos in the first video group, to generate video signals for the plurality of display devices based on the video display positions and the video display sizes, and to output the video signals to the plurality of display devices.

The multivision display control device of the present invention can easily display the plurality of videos through the operation on the group display position and the group display size of the group of videos including the plurality of videos.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram illustrating one example of display information;

FIG. 3 is a diagram illustrating an arrangement example of video sources;

FIG. 4 is a diagram schematically illustrating one example of videos displayed on a multivision;

FIG. 5 is a diagram illustrating one example of video source information;

FIG. 6 is a diagram illustrating one example of video group information;

FIG. 14 is a diagram illustrating one example of display-to-video source arrangement information;

FIG. 15 is a diagram illustrating one example of video layout information;

FIG. 18 is a diagram illustrating one example of video group information;

FIG. 19 is a diagram illustrating one example of window arrangement information;

FIG. 20 is a diagram illustrating one example of display-to-video source arrangement information;

FIG. 21 is a diagram illustrating one example of video layout information;

FIG. 22 is a diagram schematically illustrating one example of videos to be displayed on the multivision;

FIG. 23 is a diagram illustrating one example of video group information;

FIG. 24 is a diagram illustrating one example of display-to-video source arrangement information;

FIG. 25 is a diagram illustrating one example of video layout information;

FIG. 28 is a diagram illustrating one example of window arrangement information;

FIG. 29 is a diagram illustrating one example of video layout information;

FIG. 30 is a diagram illustrating one example of video group information;

FIG. 31 is a diagram illustrating one example of video layout information;

FIG. 34 is a diagram schematically illustrating one example of a video group editing screen.

DESCRIPTION OF THE PREFERRED EMBODIMENTS

<Entire Constitution>

Figure 1:
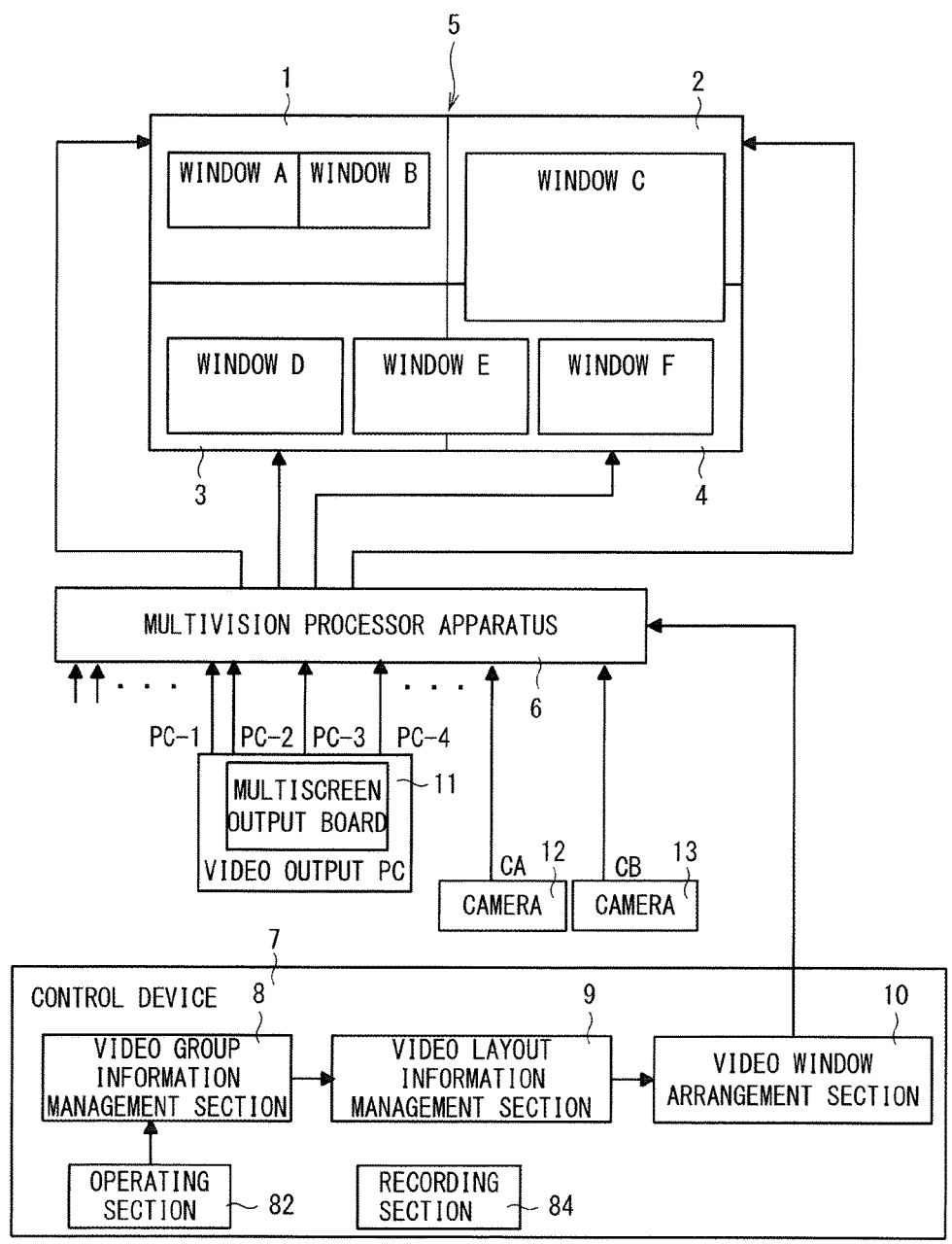
FIG. 1 is a block diagram schematically illustrating one example of a constitution of a multivision system.

FIG. 1 is a block diagram schematically illustrating one example of a constitution of a multivision system according to this preferred embodiment. As shown in FIG. 1, the multivision system includes a multivision apparatus 5, a multivision processor device 6, and a control device 7.

The multivision apparatus 5 is a display group having a plurality of display devices 1 to 4, and the display devices 1 to 4 are arranged in a lattice pattern, for example. The multivision apparatus 5 receives video signals for the display devices 1 to 4 from the multivision processor device 6 via, for example, a DVI cable, and displays videos based on the video signals.

The display devices 1 to 4 are display devices each of which has a display screen of, for example, 1920 pixels by 1080 pixels. Therefore, a screen size becomes 3840 pixels×2160 pixels on the entire multivision screen of the multivision apparatus 5.

The multivision processor device 6 receives a plurality of video signals. The multivision processor device 6 enlarges/reduces videos represented by the video signals (hereinafter, called also video sources) into videos with any sizes in cooperation with the control device 7, and displays the enlarged/reduced videos or the videos of unchanged magnification as video windows on any positions of the multivision apparatus 5. More specifically, the multivision processor device 6 generates the video signals for the display devices 1 to 4, respectively, in cooperation with the control device 7, and outputs the video signals to the multivision apparatus 5. The video windows are respective portions of the multivision screen of the multivision apparatus 5 on which the video sources are displayed.

In the example shown in FIG. 1, video windows A to F are displayed on the multivision apparatus 5. In the example of FIG. 1, the video windows A and B are displayed on the display device 1, and the video windows D and F are displayed on the display devices 3 and 4, respectively. The video window C is displayed across the display devices 2 and 4, and the video window E is displayed across the display devices 3 and 4.

The video windows C and E are displayed across the plurality of display devices, but the multivision processor device 6 outputs videos of 1920 pixels×1080 pixels corresponding to the display devices 1 to 4 as video signals for the display devices 1 to 4. That is to say, the multivision processor device 6 outputs a video signal to be displayed on the display device 1 (a video signal including the video windows A and B) to the display device 1, and outputs a video signal to be displayed on the display device 2 (a video signal including a part of the video window C) to the display device 2. The multivision processor device 6 outputs a video signal to be displayed on the display device 3 (a video signal including the video window D and a part of the video window E) to the display device 3, and outputs a video signal to be displayed on the display device 4 (a video signal including the video window F, a part of the video window C, and a part of the video window E) to the display device 4. The part of the video window C to be displayed on the display device 2 and the part of the video window C to be displayed on the display device 4 compose the video window C. Similarly, the part of the video window E to be displayed on the display device 3 and the part of the video window E to be displayed on the display device 4 compose the video window E.

In the example of FIG. 1, the multivision processor device 6 receives video sources from a video output PC (personal computer) 11 and cameras 12 and 13. The video output PC 11 has, for example, a multi-screen output board that can divide a high resolution video so as to output the divided videos. The video output PC 11 outputs, for example, video sources PC-1 to PC-4 that are obtained by dividing the video into four. The cameras 12 and 13 output captured video sources CA and CB, respectively. The video output device that outputs video signals to the multivision processor device 6 is not limited to this, and any video output devices can be employed.

The control device 7 has, as shown in FIG. 1, a video group information management section 8, a video layout information management section 9, a video window arrangement section 10, and an operating section 82.

The control device 7 includes, for example, an arithmetic processing unit (for example, a CPU) and a storage device. The arithmetic processing unit executes respective processing steps described in a program (in other words, procedures), so as to realize functions of the video group information management section 8, the video layout information management section 9 and the video window arrangement section 10, described later. The storage device is constituted by, for example, one of or a plurality of various storage devices such as a ROM (Read Only Memory), a RAM (Random Access Memory), a rewritable nonvolatile memory (EPROM (Erasable Programmable ROM)), and a hard disc device. The storage device stores various information and data, and stores programs to be executed by the arithmetic processing unit, and provides a work area where the programs are executed. It can be understood that the arithmetic processing unit functions as various sections that cope with the respective processing steps described in the programs, or realizes various functions corresponding to the respective processing steps. Further, the control device 7 is not limited to this, and various procedures to be executed by the control device 7, or various sections, or some or all of the various functions may be realized by hardware.

The control device 7 further includes a general-purpose communication interface such as RS-232C or Ethernet (registered trademark). The control device 7 and the multivision processor device 6 can communication with each other via the communication interface. Further, the control device 7 further includes a user interface such as a keyboard, a mouse, and a display monitor. The user interface is one example of the operating section 82. A PC (personal computer) can be employed as an example of the control device 7.

The respective functions of the control device 7 will be described later, and an overall summary is first described. The control device 7 sorts a plurality of video sources to be input into the multivision processor device 6 into video groups suitably so as to manage them. The video sources PC-1 to PC-4 are sorted into one video group, and the each of video sources CA and CB is sorted into another video group.

The control device 7 manages a display position and a display size of the video of each of the video groups on the multivision screen, and manages relative positions and relative sizes of the video sources in each of the video groups. The control device 7 calculates display positions and display sizes of video windows in the display devices 1 to 4 based on the above display positions and display sizes of the videos of the video groups and the relative positions and relative sizes of the video sources. The control device 7 generates four video signals that are output to the display devices 1 to 4, respectively, in cooperation with the multivision processor device 6 based on these information and the video sources PC-1 to PC-4, CA, and CB. Detailed description is given below.

<Display Information>

Prior to the detailed description about the respective function sections of the control device 7, display information representing various pieces of information about the display devices 1 to 4 is described first. FIG. 2 is a table showing one example of the display information. The display information includes display numbers, display positions, and display sizes.

The display numbers are information for classifying the display devices 1 to 4. Numbers "1" to "4" are set as the display numbers of the display devices 1 to 4, respectively. The display positions are information representing positions of the display screens of the display devices 1 to 4. The display positions are, for example, coordinate points of pixels on upper left ends on the display screens of the display devices 1 to 4 in a coordinate where a pixel of an upper left end on the multivision screen of the multivision apparatus 5 is an origin (0, 0), and their unit is a pixel. The display sizes are information representing sizes of the display screens of the display devices 1 to 4, and include a pixel number in a horizontal direction and a pixel number in a vertical direction. In an example of FIG. 2, in accordance with the custom, the display size is indicated by "(the pixel number in the horizontal direction)×(the pixel number in the vertical direction)". This notation method is employed for the other sizes.

In the example of FIG. 2, "1920×1080" is employed as the display sizes of the display devices 1 to 4. Therefore, the display position of the display device 1 on the upper left position is (0, 0), the display position of the display device 2 on the upper right position is (1920, 0), the display position of the display device 3 on the lower left position is (0, 1920), and the display position of the display device 4 on the lower right position is (1920, 1080). In this case, the size of the display screen of the multivision apparatus 5 is "3840(=1920×2)×2160(=1080×2)".

This display information is recorded in, for example, a recording section (not shown) of the multivision processor device 6 or a recording section 84 of the control device 7 in advance. This display information is, as described in detail later, used for determining positions on the display screen where the respective video sources are displayed.

<Outline of the Function of the Control Device 7>

Again with reference to FIG. 1, the video group information management section 8 manages one or more video sources as one video group. For example, the video sources PC-1 to PC-4 are managed as one video group G1, and the video sources CA and CB are managed as different video groups G2 and G3, respectively.

At time of managing the video groups, the video group information management section 8 manages at least first to fourth information described below. Specific examples of the first to fourth information will be summarized first and then will be described in detail. Various pieces of information described below are suitably recorded in the recording section 84, and is read by the respective function sections as needed.

As the first information, a relative positional relationship (hereinafter, referred also as relative positions) among the plurality of video sources in one video group is managed. FIG. 3 is a diagram illustrating one example of the positional relationship among the video sources PC-1 to PC-4 belonging to the video group G1. The video group information management section 8 manages, as the relative position, which of the video sources PC-1 to PC-4 is arranged on which position as the video window. In the example of FIG. 3, the plurality of the video sources PC-1 to PC-4 are arranged side by side without another video. More specifically, the video sources PC-1 to PC-4 are arranged in a lattice pattern.

As the second information, a relative size relationship among the plurality of video sources in one video group (hereinafter, referred to also as a relative size) is managed. It is assumed that the video sources PC-1 to PC-4 belonging to the video group G1 have the same size.

As the third information, a display position (hereinafter, referred to also as group display position) of video of each of the groups (the video composed of video windows corresponding to the video sources belonging to each the video groups, which correspond to display videos in Claims) on the multivision apparatus 5 is managed.

As the fourth information, a size of the video of each the groups on the multivision apparatus 5 (hereinafter, referred to also as group display size) is managed. FIG. 4 illustrates one example of a display screen of the multivision apparatus 5 when videos W1 and W2 in the video groups G1 and G2 are displayed on the multivision apparatus 5.

The video group information management section 8 manages video source information and video group information as more specific example. FIG. 5 is a list showing one example of the video source information, and FIG. 6 is a list showing one example of the video group information. The video source information and the video group information illustrated in FIGS. 5 and 6 further include information other than the above first to fourth information. The video source information and the video group information are described in detail below.

As shown in FIG. 5, the video source information includes a source number, a window name, a source resolution and description of videos.

The source number is one piece of information for classifying a video source, and numbers "1" to "6" are set as source numbers of the video sources PC-1 to PC-4, CA, and CB. The window name is a different piece of information for classifying a video source, and is a name of a video window corresponding to a video source. The same symbol is used for a video source and a corresponding window name.

In order to distinguish the video sources, it is enough to employ any one of the source number and the window name.

The source resolution is information about sizes of the respective video sources. Since a width of a screen (unit is, for example, inch) and the number of pixels included in that screen are determined to be related with each other in accordance with the standard, a resolution (=the width of the screen/the number of pixels) can be roughly specified by the number of pixels. Therefore, the number of pixels of each of the video sources is referred to also as the resolution.

In the example of FIG. 5, "1920×1080" is set as the resolutions of the video sources PC-1 to PC-4. This is the same as the display sizes of the display devices 1 to 4. Further, in the example of FIG. 5, "1600×900" and "800×600" are set as the resolutions of the video sources CA and CB, respectively.

The sizes of the video sources shown in FIG. 5 (resolutions) represent initial sizes. Actually the sizes displayed on the multivision apparatus 5 might be different from these sizes. As will be detailed later, the relative sizes of the video sources belonging to one video group do not fluctuate depending on the sizes of the video windows. For example, since the sizes of the video sources PC-1 to PC-4 in FIG. 5 (they belong to the video group G1) are "1920×1080", a size ratio of the video sources PC-1 to PC-4 is 1:1:1:1. This size ratio is employed also in actual display (display on the multivision screen: see also FIG. 4). Therefore, the source resolution included in the video source information corresponds to one example of the above relative size (the second information).

The description about videos is information about obtaining sources of video sources, etc. The description about videos is not, however, essential.

With reference to FIG. 6, the video group information includes a group number, a source arrangement number, a source arrangement position, a source number, existence/non-existence of a group display, a group display position, a group display size, and a group overlapping order.

The group number is information for distinguishing the video groups G1 to G3, and numbers "1" to "3" are set as the group numbers of the video groups G1 to G3, respectively.

The source arrangement number represents the number of video sources included in the video groups G1 to G3. As one example, in the video groups, the plurality of video sources are displayed side by side without another video. As more specific example, the plurality of video sources are arranged in a lattice pattern (see also FIGS. 3 and 4). Therefore, the source arrangement number includes information about the number of the video sources in the horizontal direction and information about the number of the video sources in the vertical direction. In the example of FIG. 6, the source arrangement number is represented by "(the number of the video sources in the horizontal direction)×(the number of the video sources in the vertical direction)" in accordance with the custom. In the example of FIG. 6, "2×2" is shown as the source arrangement number of the video group G1. Further, since the numbers of the video sources (the video sources CA and CB) belonging to the video groups G2 and G3 are 1, "1×1" is shown as the source arrangement numbers of the video groups G2 and G3.

The source arrangement position is information about positions where the video sources are arranged. Since the plurality of video sources are arranged in the lattice pattern, the source arrangement position can be represented by a set of the order starting from a left side in the horizontal direction and an order starting from an upper side in the vertical direction. In the example of FIG. 6, the four source arrangement positions (1, 1), (2, 1), (1, 2), and (2, 2) are present for the video group G1, and the one source arrangement position (1, 1) is present for each of the video groups G2 and G3.

The source number is information for specifying a video source to be displayed on a position represented by each of the source arrangement positions. In the example of FIG. 6, numbers "1" to "4" are set as the source numbers corresponding to the source arrangement positions (1, 1), (2, 1), (1, 2), and (2, 2) of the video group G1, respectively. Therefore, the video sources PC-1, PC-2, PC-3, and PC-4 belonging to the video group G1 are arranged on upper left, upper right, lower left and lower right positions, respectively, as illustrated in FIGS. 3 and 4.

Since only the video sources CA and CB are present in the video groups G2 and G3, respectively, both the source arrangement positions are (1, 1). The video sources CA and CB (the source numbers 5 and 6) are arranged in the video groups G2 and G3, respectively.

One set of the source arrangement number, the source arrangement position, and the source number related to the source arrangement position corresponds to one example of relative positions (the first information) of the plurality of video sources in each video group.

The presence/non-presence of group display is information representing whether a video of each video group is displayed, and in the example of FIG. 6, "present", "present", and "not present" are shown as the presence/non-presence of group display of the video groups G1 to G3, respectively. The control device 7 determines presence/non-presence of display of the video groups G1 to G3 based on the presence/non-presence of group display, as will be detailed later.

Further, the presence/non-presence of group display can be changed by user's operation in the operating section 82, as will be described in <Modification of Display Form> later. In other words, the operating section 82 receives an operation for determining whether a video of a video group is displayed. The video group information management section 8 updates the presence/non-presence of group display based on the changing operation.

A group display position (the third information) is information representing positions of the videos of the video groups G1 to G3 on the multivision apparatus 5. A coordinate point of a pixel, which is on the upper left end of the video of the video group on the coordinate where a pixel at the upper left end of the multivision apparatus 5 is an origin (0, 0), is shown as the group display position. In the example of FIG. 6, (1500, 700) is shown as the group display position of the video group G1. Further, (0, 0) is shown as the group display position of the video group G2.

A group display size (the fourth information) represents a size of a video of each of the video groups G1 to G3 (size on the multivision apparatus 5). The number of pixels in the horizontal direction and the number of pixels in the vertical direction are shown as the group display size. In the example of FIG. 6, "1920×1080" is shown as the group display size of the video group G1, and "1600×900" is shown as the group display size of the video group G2. That is to say, the display size of the video W1 is 1920×1080, and the display size of the video W2 is 1600×900.

Further, the group display position and the group display size can be changed by a user's operation in the operating section 82 as will be described in <Modification of Display Form> later. For example, when a changing operation for parallel movement or enlargement/reduction is performed on the video W1 of the video group G1 displayed on the multivision apparatus 5 (one set of the video windows PC-1 to PC-4) by using the operating section 82, the video group information management section 8 determines/updates the group display position and the group display size based on the changing operation.

The group overlapping order is information representing a priority of a video group to be displayed on an overlapped portion where at least parts of videos of the video groups G1 to G3 are overlapped. In the example of FIG. 6, "1" and "2" are set as the group overlapping orders of the video groups G1 and G2, respectively. As the group overlapping order is smaller, the priority is higher.

The group overlapping order is updated also by a user's operation in the operating section 82. In other words, when at least parts of the videos of the video groups are overlapped with each other, the operating section 82 receives an operation for specifying the video group whose video is to be displayed. For example, the changing operation for moving the video of the video group G1 displayed on the multivision apparatus 5 to the most front surface is performed in the operating section 82. The video group information management section 8 determines/updates the group overlapping order based on the changing operation.

Only when the presence/non-presence of group display indicates "present", values may be set for the group display position, the group display size, and the group overlapping order. In the example of FIG. 6, these values are not set in the video groups G3 where the presence/non-presence of group display indicates "not present". As a result, the management of unnecessary data can be avoided.

The control device 7, as will be described in detail below, calculates display positions and sizes in the display devices 1 to 4 of video windows to be displayed on the display devices 1 to 4, respectively, based on the video source information, the video group information (particularly the first to fourth information), and the display information in cooperation with the multivision processor device 6, and generates video signals for the display devices 1 to 4 based on the display positions and sizes in the display devices 1 to 4.

The video source and the video window indicate the same video although they are different in whether they are displayed on the multivision screen, namely, in resolution and presence/non-presence of enlargement/reduction. Therefore, hereinafter, in order to avoid redundant expression, the information to be given to the video source and the video window is occasionally expressed as information to be given commonly to the video source and the video window. For example, the source number is information for distinguishing video sources, but hereinafter it is expressed also as "the source number of the video window PC-1. This means that the source number of the video source PC-1 corresponding to the video window PC-1.

For example, when the video source information and the video group information shown in FIGS. 5 and 6 are used, the videos W1 and W2 of the video groups G1 and G2 are displayed on the multivision apparatus 5 as shown in FIG. 4.

Hereinafter, the detail description will be given of how to display/not to display the videos of the video groups G1 to G3 on the multivision apparatus 5 based on the video source information and the video group information.

The video group information management section 8 first checks the presence/non-presence of group display in the video group information. The following process is executed only on video groups where the presence/non-presence of group display indicates "present" (the video groups G1 and G2).

The video group information management section 8 calculates video layout information of a video source to be displayed on the multivision apparatus 5 based on the video group information and the video source information. The video layout information includes sizes of the video sources on the multivision screen (in other words, sizes of video windows corresponding to the video sources: hereinafter, referred to also as video display sizes), and display positions of video windows corresponding to the video sources on the display screens of the display devices 1 to 4 (hereinafter, referred to also as display positions on the displays).

The calculation of a video display size is first described. The video display size is calculated so that a relative size and a relative position of the video windows on the multivision apparatus 5 are equal to a relative size and a relative position of the video sources in consideration of a relative size, a relative position (of the plurality of video sources belonging to one video group), and the group display size. Since the plurality of video sources is arranged in the lattice pattern, the video display size Sx2 in the horizontal direction, and the video display size Sy2 in the vertical direction are taken into consideration. Further, as illustrated in FIG. 5, it is assumed that the sizes of the plurality of video sources belonging to one video group are the same as each other. At this time, when the group display sizes Sx1 and Sy1 in the horizontal direction and the vertical direction, and the numbers Nx and Ny of the video sources in the horizontal direction and the vertical direction are used, the video display sizes Sx2 and Sy2 are expressed by the following formulas (see also FIGS. 4 and 6).

$$Sx2=Sx1/Nx \tag{1}$$

$$Sy2=Sy1/Ny \tag{2}$$

The sizes of the plurality of video sources may be different from each other. Also in this case, the video display sizes can be geometrically calculated in consideration of the relative size.

The video group information management section 8 reads the video source information and the video group information, and calculates the video display sizes of the video windows for each of the video groups G1 and G2 using the formulas (1) and (2), for example.

Figures 7, 8, 9:
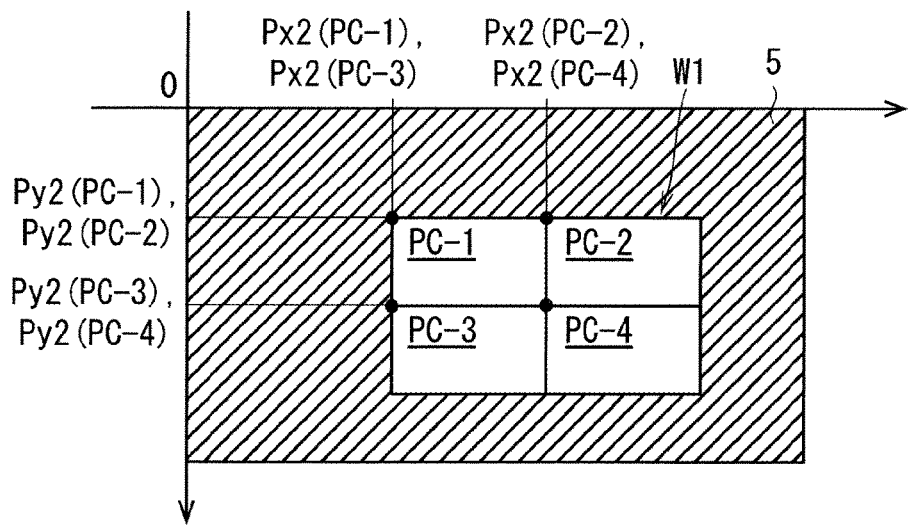
FIG. 7 is a diagram illustrating one example of window arrangement information.
FIG. 8 is a diagram illustrating one example of a video source on a multivision coordinate.
FIG. 9 is a diagram illustrating one example of window arrangement information.

FIG. 7 illustrates one example of correspondence between the video sources PC-1 to PC-4 belonging to the video group G1 and the video display sizes. In the example of FIG. 7, the video display sizes corresponding to the video sources PC-1 to PC-4 (the source numbers "1" to "4") are "960×540{=(1920/2)×(1080/2)}".

The display position on the display is calculated. The display positions of the video sources on the multivision apparatus 5 (in other words, the display positions of the video windows corresponding to the video sources: hereinafter, referred to as display positions on the vision) are calculated. A coordinate, which is specific to the multivision apparatus 5 (hereinafter, referred to also as a multivision coordinate) and where a pixel on the upper left end of the multivision apparatus 5 is the origin (0, 0), is taken into consideration. In this multivision coordinate, for example, the coordinate point of the pixel at the upper left end of each video window is set as the display position on the vision of the video source corresponding to each video window.

FIG. 7 illustrates also correspondence between the video sources PC-1 to PC-4 (the source numbers 1 to 4), and the display positions on the vision. The display position on the vision is calculated as follows, for example, by using the group display position (see FIG. 6) of the video group to which each video source belongs, a relative position of each of the video sources (see FIG. 6), and the video display size of the video window corresponding to each video source (see FIG. 7). That is to say, when the group display position is set as (Px1, Px1), and the source arrangement position in FIG. 6 is set as (Hx, Hy), the display position (Px2, Py2) on the vision of each video source can be expressed by the following formulas.

$$Px2=Px1+(Hx-1)\cdot Sx2 \quad (3)$$

$$Py2=Py1+(Hy-1)\cdot Sy2 \quad (4)$$

The video group information management section 8 reads the video source information and the video group information, and calculates the display position on the vision of the video source for each of the video groups G1 and G2 using the formulas (3) and (4), for example. In the examples of FIGS. 6 and 7, the group display position of the video group G1 is (1500,700), and the source arrangement position and the video display size of the video source PC-1 are (1, 1) and "960×540", respectively. Therefore, the display position on the vision of the video source PC-1 is calculated as (1500×700) by using the formulas (3) and (4). Further, in the video source PC-2, the source arrangement position and the video display size are (2, 1) and "960×540", respectively. Therefore, the display position on the vision of the video source PC-2 is calculated as (2460, 700) using the formulas (3) and (4). Similarly, the display positions on vision of the video sources PC-3 and PC-4 are calculated as shown in FIG. 7.

FIG. 8 schematically illustrates the video windows PC-1 to PC-4 on the multivision coordinate. In an example of FIG. 8, window names of the video windows that are subjects of the display positions on vision Px2 and Py2 are indicated by parentheses. For example, "Px2(PC-1)" indicates a display position on vision of the video window PC-1 in the horizontal direction.

The information shown in FIG. 7 is referred to also as window arrangement information. The window arrangement information includes the source number, the display position on vision and the video display size.

FIG. 9 illustrates one example of the window arrangement information about the video group G2. Since the video group G2 includes only one video source CA (the source number 5: see FIG. 5), the video display size and the display position on vision of the video window CA calculated by the formulas (1) to (4) are the same as the group display size and the group display position (see FIG. 6) of the video group G2.

Next, the display positions of the video windows PC-1 to PC-4, and CA on the display devices 1 to 4 (the display positions on display) are calculated. This calculation is performed by, for example, the video layout information management section 9.

As to description about the display position on display, the display coordinates specific to the display devices 1 to 4 are described first. The origin of the display coordinate (0, 0) is, for example, a pixel at the upper left end of each display screen. On each display coordinate, a coordinate point of a pixel at the upper left end of each video window is the display position on display.

FIGS. 10 to 13 are diagram illustrating one example of the display position on display of the video window PC-2 in each of the display devices 1 to 4. In examples of FIGS. 10 to 13, the display position on vision is indicated by a coordinate point (Px3, Py3) on the display coordinate. These display positions on display are calculated as follows, for example, by using the display position on vision of the video window PC-2, and the display position of each of the display devices 1 to 4. For example, when the display position is expressed by (DPx1, DPy1), the display position on display (Px3, Py3) can be expressed by the following formulas.

$$Px3=Px2-DPx1 \quad (5)$$

$$Py3=Py2-DPy1 \quad (6)$$

The video layout information management section 9 receives the display information and the window arrangement information from the video group information management section 8, or reads them from the recording section 84. The display position on display is calculated by using for example, the formulas (5) and (6).

In the example of FIG. 2, the display positions (DPx1, DPy1) of the display devices 1 to 4 are (0, 0), (1920, 0), (0, 1920), and (1920, 1920), respectively, and in the example of FIG. 7, the display position on vision (Px2, Py2) of the video window PC-2 is (2460, 700). Therefore, the display positions on display (Px3, Py3) of the video window PC-2 on the display devices 1 to 4 are calculated as (2460, 700), (540, 700), (2460, −380), and (540, −380), respectively, by using the formulas (5) and (6). In examples of FIGS. 10 to 13, these values are described in parentheses.

In the examples of FIGS. 10 to 13, the display positions on display of the video window PC-2 are described, but similarly the video layout information management section 9 calculates also the display positions on display corresponding to the video sources PC-1, PC-3, and PC-4 belonging to the video group G1. Further, the video layout information management section 9 similarly calculates the display position on display corresponding to the video source CA in the video group G2 whose presence/non-presence of group display indicates "present". As a result, the display positions and sizes of the video windows are calculated so that the plurality of video sources belonging to the video group are displayed side by side without another video.

The video layout information management section 9 then specifies display devices on which at least parts of the respective video window should be displayed. In the examples of FIGS. 10 to 13, the video window PC-2 is not displayed on the display devices 1 and 3, a part of the video window PC-2 is displayed on the display device 2, and a residual part is displayed on the display device 4. Therefore, the display devices 2 and 4 are specified as the display device on which at least parts of the video window PC-2 should be displayed.

Such specification of the display devices can be performed as follows based on the display position on display and the video display size of each video window, and the display size. For example, a display that does not satisfy any of the following formulas is specified as a display on which at least a part of the video window is displayed. The display sizes of the display devices 1 to 4 is (DSx1, DSy1).

$$Px3 > DSx1 \quad (7)$$

$$Py3 > DSy1 \quad (8)$$

$$Px3 + Sx1 < 0 \quad (9)$$

$$Py3 + Sy1 < 0 \quad (10)$$

In other words, a display device that satisfies $-Sx1 \leq Px3 \leq DSx1$, and $-Sy1 \leq Py3 \leq DSy1$ is specified as the display device on which at least a part of the video window is displayed.

Figure 10:
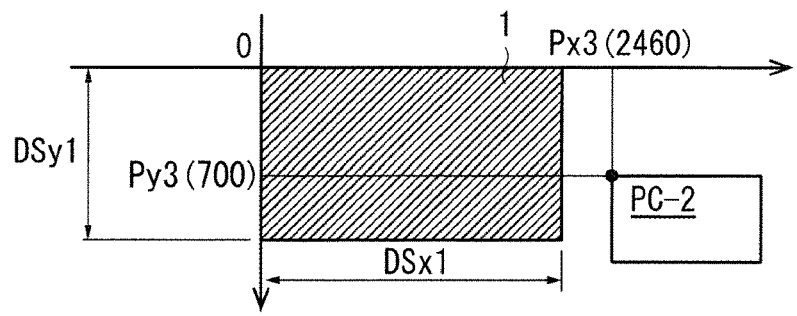
FIGS. 10 to 13 each are a diagram illustrating one example of a video source on a display coordinate.
Figure 11:
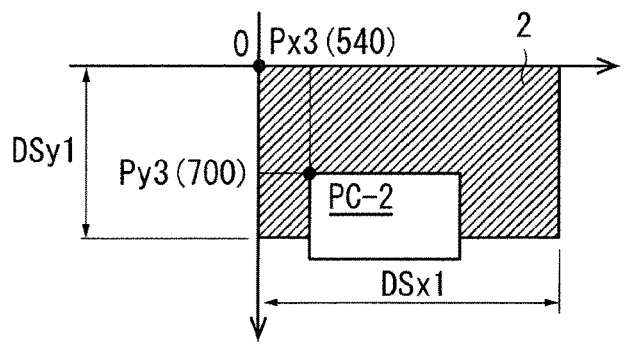
Figure 12:
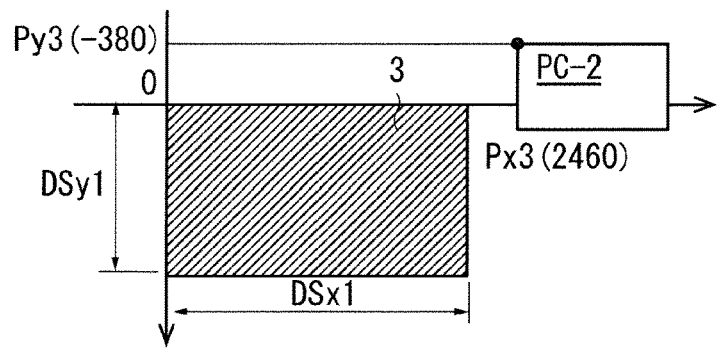
Figure 13:
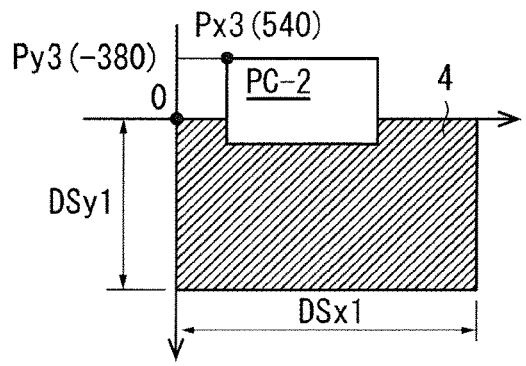

In the example of FIG. 10, the display position on display of the video window PC-2 on the display device 1 is (2460, 700). At this time, since the formula (7) is satisfied, it is determined that the video window PC-2 is not displayed on the display device 1. Further, in the example of FIG. 11, the display position of the video window PC-2 on the display device 2 is (540, 700), and since none of the formulas (7) to (10) is satisfied, it is determined that at least a part of the video window PC-2 is displayed on the display device 2. Hereinafter, it is similarly determined that the video window PC-2 is not displayed on the display device 3, and it is determined that at least a part of the video window PC-2 is displayed on the display device 4. As a result, the display devices 2 and 4 are specified as the display device that displays at least a part of the video window PC-2.

Similarly, display devices that display at least parts of the video window PC-1, PC-3, PC-4, and CA are specified. FIG. 14 illustrates display numbers for distinguishing the display devices 1 to 4, and the source numbers of the video sources corresponding to the video windows to be displayed on the display devices. Since the video window PC-1 is displayed across the display devices 1 to 4 (FIG. 4), the source number "1" are related to the plurality of display numbers "1" to "4". The same is true on the other source numbers. Hereinafter, this information is referred to also as display-to-video source display information.

FIG. 15 illustrates examples of the display numbers for distinguishing the display devices 1 to 4, the source numbers related to the video windows to be displayed on the display devices, and the display positions on display, the video display sizes and source overlapping orders (described later) of the video windows. Hereinafter, the information including them is referred to also as the video layout information. The video layout information (excluding the source overlapping order) is calculated or generated by the video layout information management section 9 in the above manner.

The video layout information management section 9 then determines the overlapping orders of the video windows on the display devices (hereinafter, referred to also as source overlapping orders). The source overlapping orders are serial numbers specific to the display devices 1 to 4. That is to say, the serial numbers starting from 1 are given to the video sources to be displayed on the display device 1, and the serial numbers starting from 1 are given also to the video windows to be displayed on the display device 2. The same is true on the display devices 3 and 4. More detailed procedure is described below.

The video layout information management section 9 receives the group overlapping orders of the video groups from the video group information management section 8, or reads them from the recording section 84. The video layout information management section 9 allocates the serial numbers to the video windows belonging to the video groups with smaller group overlapping orders starting from one with the smallest source number, for example, for each display device, and the serial numbers are set as the source overlapping orders. When the plurality of video groups are displayed, a smaller serial number is set as the source overlapping order of the video sources belonging to the video group with a smaller group overlapping order, and a next serial number is set as the source overlapping order of the video sources belonging to the video group with a next smaller group overlapping order. Hereinafter, this operation is repeated.

For example, the video source PC-1 (the source number "1") and the video source CA (the source number "5") are displayed on the display device 1 (see also FIG. 15). In the example of FIG. 6, the group overlapping order of the video group G1 to which the video source PC-1 belongs is "1", and the group overlapping order of the video group G2 to which the video source CA belongs is "2". Therefore, in the display device 1, the video layout information management section 9 sets the source overlapping order of the video source PC-1 belonging to the video group G1 with the small group overlapping order to "1", and sets the source overlapping order of the video source CA belonging to the video group G2 with the large group overlapping order, to "2". FIG. 15 also illustrates the source numbers "1" and "5" in relation with the display number "1", and "1" and "2" as the source overlapping orders.

Further, for example, the video sources PC-1 and PC-2 (the source numbers "1" and "2") are displayed on the display device 2, for example, (see also FIG. 15). Both the video sources PC-1 and PC-2 belong to the same video group G1. Therefore, the numbers are set for the video sources in increasing order of the source number. Since the source numbers of the video source PC-1 and PC-2 are "1" and "2", "1" and "2" are set for the source overlapping orders. FIG. 15 also illustrates the source number "1" and "2" in relation with the display number "2", and thus shows "1" and "2" as the source overlapping orders.

The video layout information management section 9 determines the source overlapping orders similarly for the other display devices 3 and 4, and generates the video layout information shown in FIG. 15.

Again with reference to FIG. 1, the video window arrangement section 10 receives the video layout information from the video layout information management section 9, or reads it from the recording section 84. The video window arrangement section 10 outputs video signals to the display devices 1 to 4 via the multivision processor device 6. That is to say, the video window arrangement section 10 generates video signals to be displayed on the display devices 1 to 4 based on the video layout information and the video sources PC-1 to PC-4, CA and CB in cooperation with the multivision processor device 6, and outputs the video signals to the display devices 1 to 4. For example, the video window arrangement section 10 outputs the video layout information and a display command to the multivision processor device 6, and the multivision processor device 6 generates video signals base on the video layout information.

The display devices 1 to 4 that receives the video signals display videos on the self display screens, and thus a desired video (here, the video of FIG. 4) is displayed on the multivision apparatus 5.

<Change of Video Display>

A user operates the operating section 82 so as to be capable of changing a display form (the display position and the display size) of the video displayed on the multivision apparatus 5 in terms of the video groups. The change of the display form is described below.

<Change of Display/Non-Display of Video Display>

Figures 16, 17:
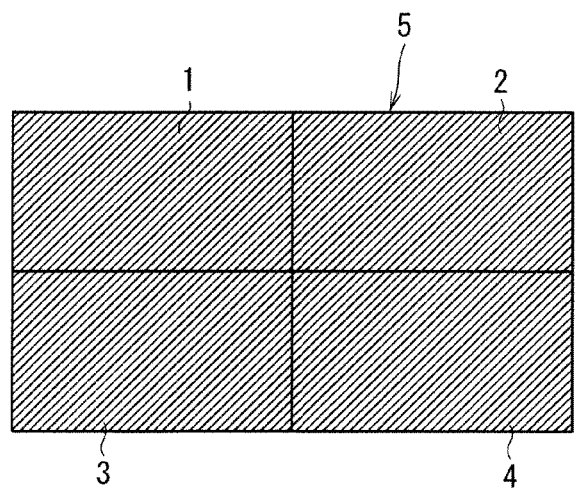
FIG. 16 is a diagram illustrating one example of video group information.
FIG. 17 is a diagram schematically illustrating one example of a video to be displayed on the multivision.

First, a state that a video source is not displayed on the multivision apparatus 5 is assumed. At this time, the video group information management section 8 sets the video group information as shown in FIG. 16. In comparison with FIG. 6, the presence/non-presence of group display is set to "non-present" for all the video groups G1 to G3. FIG. 16 exaggeratedly illustrates a portion different from FIG. 6. The same is true on the other drawings that are seen later.

With this setting, the video group information management section 8 clears all the values of the group display position, the group display size and the group overlapping order.

In the video group information, since a video group to be displayed is not present, the video layout information is not generated. In this case, the video window arrangement section 10 does not issue a display command to the multivision processor device 6, and a video window is not displayed on the multivision apparatus 5. FIG. 17 illustrates one example of the display screen of the multivision apparatus 5 at this time.

It is considered that the video of the video group G1 is displayed on the entire multivision apparatus 5. That is to say, the video windows PC-1 to PC-4 are arranged without another video (for example, arranged in the lattice pattern), and they are displayed on the entire multivision apparatus 5.

The user operates the operating section 82 so as to display the video windows PC-1 to PC-4 (the video of the video group G1) on the entire multivision apparatus 5. Such an operation is performed by using, for example, a graphical user interface displayed on the display device belonging to the control device 7, and a publicly-known mouse or the like for operating the graphical user interface. Since this point is applied to another changing operation, repeated description is avoided.

The operating section 82 receives the changing operation on the video of each group regardless of whether the videos of the respective groups are displayed on one display device or across the plurality of display devices. That is to say, the operating section 82 does not receive the changing operation for individual video windows corresponding to the video sources belonging to each of the video groups, but receives the changing operation in terms of video group.

The video group information management section 8 that receives the changing operation updates the video group information based on the changing operation. FIG. 18 is a table illustrating one example of the video group information after the updating. As shown in FIG. 18, the video group information management section 8 updates the presence/non-presence of group display of the video group G1 to "present". Due to the entire display, the group display position, the group display size and the group overlapping order are updated to "(0, 0)", "3840×2160" (=the screen size of the multivision apparatus 5), "1", respectively.

This process can be realized by recording the changing operation for display on the entire screen, and the relationship between the group display size and the group display position related to the changing operation in advance, and updating the video group information in the video group information management section 8 based on the relationship. Therefore, the changing operation for display on the entire screen means to input the video group display size and the group display position indirectly. In other words, the operating section 82 accepts an input of the group display position and the group display size.

The video group information management section 8 calculates the video display sizes and the display positions on vision of the video sources PC-1 to PC-4 belonging to the video group G1 where the presence/non-presence of group display indicates "present".

For example, the video display sizes of the video windows PC-1 to PC-4 are calculated by using the formulas (1) and (2), and the display positions on vision of the video windows PC-1 to PC-4 are calculated by using the formulas (3) and (4). The window arrangement information as the result is shown in FIG. 19.

The window arrangement information (FIG. 19) including the video display sizes and the display positions on vision is input into the video layout information management section 9. The video layout information management section 9 calculates the display positions on display of the video windows to be displayed on the display devices 1 to 4, based on the window arrangement information and the display information. As described above, this calculation is performed by calculating the display positions on display of all the video windows on each display device using the formulas (5) and (6), and specifying a display device on which at least a part of each video window should be displayed using the formulas (7) to (10). The display-to-video source display information and the video layout information as the result are shown in FIGS. 20 and 21, respectively.

Further, the video layout information management section 9 determines the source overlapping order of the video windows to be displayed on the display devices, as shown in FIG. 21. The method for determining the source overlapping order is as described above, and thus the source overlapping order is determined as shown in FIG. 21.

The video layout information (FIG. 21) is input into the video window arrangement section 10. The video window arrangement section 10 and the multivision processor device 6 generate video signals for the display devices 1 to 4 based on the video layout information and output them. As a result, the video of the video group G1 is displayed on the entire screen in the multivision apparatus 5. When an outer frame displayed in FIG. 3 is recognized as a display screen frame of the multivision apparatus 5, it can be recognized that FIG. 3 illustrates the display screen of the multivision apparatus 5 when the video of the video group G1 is displayed on the entire multivision apparatus 5.

On the contrary, when the video of the video group G1 is not displayed, the user performs the changing operation for non-display of the video of the video group G1 through the operating section 82. The video group information management section 8 updates the video group information based on the changing operation. More specifically, the presence/non-presence of group display of the video group G1 is updated to "non-present", and the group display size, the group display position and the group overlapping order of the video group G1 are cleared (FIG. 16).

The video layout information management section 9 clears respective information (the video layout information or the like) based on the video group information, and the video window arrangement section 10 halts the display command to the multivision processor device 6. As a result, as shown in FIG. 17, the display of the videos on the multivision screen is stopped.

<Parallel Movement or Enlargement/Reduction of Video>

Next, it is considered that the video of the video group G1 is moved in parallel, or enlarged/reduced. FIG. 22 illustrates one example of the display screen of the multivision apparatus 5 when the video of the video group G1 displayed on the entire screen is moved in parallel and reduced.

The operating section 82 accepts the changing operation on the videos in each video group regardless of whether they are displayed across the plurality of display devices. As one example, the changing operation is performed so as to move the video of the video group G1 displayed across the display devices 1 to 4 in parallel and reduce it.

The video group information management section 8 updates the group display position and the group display size of the video group G1 that should be displayed after the changing operation, based on the changing operation in the operating section 82. With the changing operation to be input into the operating section 82, since information such as a parallel movement amount and a reduction ratio can be obtained by publicly known means, the control device 7 can determine the group display position and the group display size based on the information through publicly-known means. Therefore, with this changing operation, the group display position and the group display size are input indirectly. In other words, the operating section 82 accepts inputs of the group display position and the group display size.

FIG. 23 illustrates one example of the video group information after the updating. In FIG. 23, the group display position and the group display size are updated into (1500, 700) and "1920×1080", respectively.

The video group information management section 8 calculates the video display sizes of the video sources PC-1 to PC-4 belonging to the video group G1 whose presence/non-presence of group display indicates "present" based on the formulas (1) and (2), and calculates the display positions on vision of the video sources PC-1 to PC-4 based on the formulas (3) and (4), for example. The window arrangement information as the result is the same as that in FIG. 7.

The video layout information management section 9 calculates the display positions on display of the video windows PC-1 to PC-4 on the display devices 1 to 4 using, for example, the formulas (5) and (6), and specifies display devices on which at least parts of the video windows should be displayed based on, for example, the formulas (7) to (10). The display-to-video source information and the video layout information as the result are shown in FIGS. 24 and 25, respectively.

The source overlapping orders are determined for the video windows in the display devices represented by the display-to-video source display information as shown in FIG. 25. The method for determining the source overlapping order is as described above. For example, the video windows PC-1 to PC-4 belonging to the video group G1 whose group overlapping order is "1" are displayed on the display device 4. Therefore, serial numbers are given to these four video windows PC-1 to PC-4, and the source overlapping orders of them are determined as "1" to "4".

The video window arrangement section 10 and the multivision processor device 6 generate video signals for the display devices 1 to 4 based on the video layout information (FIG. 25) and output them. As a result, the video of the video group G1 that is reduced are displayed on the multivision apparatus 5 as shown in FIG. 22.

As described above, the user performs the changing operation on the entire video group G1 including the plurality of video windows PC-1 to PC-4 integrally, so as to be capable of changing the display of the video group G1. Therefore, the user can change the display of the video of the video group through less operation than a case where the changing operation is performed individually on the video windows PC-1 to PC-4. In other words, a plurality of videos can be easily displayed by an operation on the group display position and the group display size of one group of plurality of the videos.

<Operation for Changing the Overlapping Order>

Figures 26, 27:
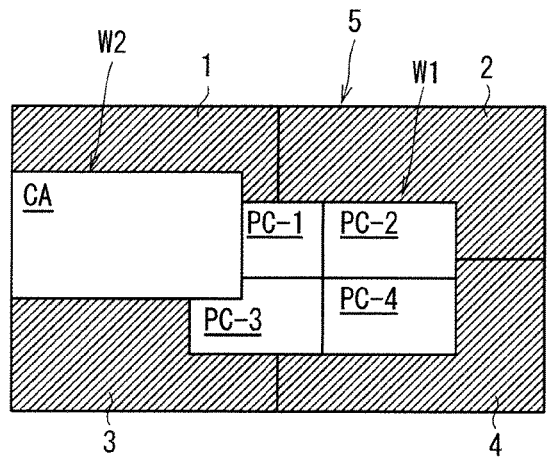
FIG. 26 is a diagram schematically illustrating one example of videos to be displayed on the multivision.
FIG. 27 is a diagram illustrating one example of video group information.

Next, the description is given of the overlapping order changing operation in a case where at least part of the videos of the plurality of video groups are overlapped with each other on the multivision apparatus 5. FIG. 26 is a diagram illustrating one example of a display screen of the multivision apparatus 5. In the example of FIG. 26, the videos of the video groups G1 and G2 are displayed on the multivision apparatus 5. The video of the video group G1 is displayed on the multivision apparatus 5 in the display form (display size and display position) that is the same as FIG. 4. The video of the video group G2 is displayed across the display devices 1 and 3, and the part of it overlaps with the parts of the video of the video group G1. In the example of FIG. 26, the part of the video of the video group G1 is hidden by the video of the video group G2. On the contrary, the video of the video group G2 is preferentially displayed.

For example, the user performs the changing operation for displaying the videos of the video groups G1 and G2 in the display form of FIG. 26 on the operating section 82. The video group information management section 8 updates the video group information based on the changing operation. FIG. 27 is a table showing one example of the video group information after the updating. In comparison with the video group information in FIG. 23, the presence/non-presence of group display of the video group G2 is updated to "present", and the group display position and the group display size are updated to (0, 500) and "1600×900", respectively. Further, the group overlapping orders of the video groups G1 and G2 are updated to "2" and "1", respectively.

The video group information management section 8 then calculates the video display sizes and the display positions on vision of the video windows belonging to the video group whose presence/non-presence of group display indicates "present", and updates the window arrangement information, similarly to the above description. The window arrangement information of the video group G1 is as shown in FIG. 7, and the window arrangement information of the video group G2 is as shown in FIG. 28.

The video layout information management section 9 specifies a display device on which each of the video windows should be displayed similarly to the above description, and calculates the display position on display in the display devices. Further, the video layout information management section 9 updates the source overlapping orders similarly to the above description so as to update the video layout information. FIG. 29 is a list illustrating one example of the video layout information after the updating. In comparison with the video layout information of FIG. 25, the display position on display on the display device 1, the video display size, the source overlapping order of the video window CA (the source number "5"), and the source overlapping order of the video window PC-1 are updated. The display position on display of the video window CA in the display device 1 is (0, 500), the video display size is "1600×900", and the source overlapping order is "1". Further, the source overlapping order of the video window PC-1 on the display device 1 is "2".

Further, the display position on display in the display device 3, the video display size, and the source overlapping order of the video window CA, and the source overlapping orders of the video windows PC-1 and PC-3 in the display device 3 are updated. The display position on display of the video window CA in the display device 3 is (0, −580), and the video display size is "1600×900", and the source overlapping order is "1". Further, the source overlapping orders of the video windows PC-1 and PC-3 in the display device 3 are "2" and "3", respectively.

The video window arrangement section 10 and the multivision processor device 6 generate video signals for the display devices 1 to 4, based on the video layout information (FIG. 25), and outputs them to the multivision apparatus 5. As a result, the video shown in FIG. 26 is displayed on the multivision apparatus 5.

Next, the video group G1 in the display form of FIG. 26 is moved to a forefront surface. That is to say, the video of the video group G1 is displayed on portion where the videos of the video groups G1 and G2 overlap with each other. When the videos of the video groups overlap with each other, the operating section 82 inputs an operation for specifying which of the videos of the video groups is displayed. Therefore, the user performs the changing operation for displaying the video of the video group G1 in the operating section 82.

The video group information management section 8 updates the video group information of each video group based on the changing operation. More specifically, the group overlapping orders of the video groups G1 and G2 are updated. FIG. 30 is a list illustrating one example of the video group information after the updating. The group overlapping orders of the video groups G1 and G2 are updated to "1" and "2", respectively.

Since current levels of the group display position and the group display size are maintained, a current level is maintained also as to the window arrangement information.

Next, the video layout information management section 9 determines the source overlapping order for each display screen, and updates the video layout information. FIG. 31 is a table illustrating one example of the video layout information after the updating. In comparison with the video layout information of FIG. 29, the source overlapping orders in the display devices 1 and 3 are updated. Since the group overlapping orders of the video groups G1 and G2 are "1" and "2", respectively, the source overlapping order of the video window PC-1 in the display device 1 is updated to "1", and the source overlapping order of the video window CA in the display device 1 is updated to "2".

Further, the source overlapping order in the display device 3 is also updated. Since the group overlapping order of the video group G1 is "1", the source overlapping orders of the video windows PC-1 and PC-2 belonging to the video group G1 in the display device 3 are updated to "1" and "2", respectively, and then the source overlapping order of the video window CA belonging to the video group G2 whose group overlapping order is "2" in the display device 3 is updated to "3".

Figure 32:
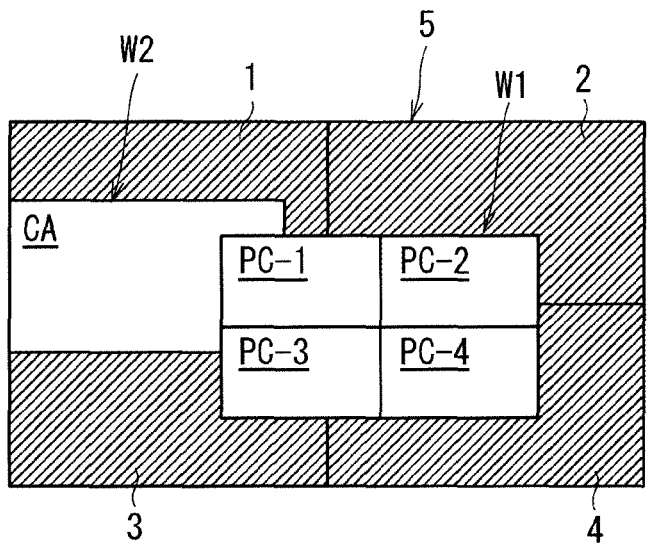
FIG. 32 is a diagram schematically illustrating one example of videos to be displayed on the multivision.

The video window arrangement section 10 and the multivision processor device 6 generate video signals for the display devices 1 to 4 so that a video having the highest source order is displayed on the overlapped portion based on the video layout information (FIG. 31), and outputs them to the multivision apparatus 5. As a result, the video shown in FIG. 32 is displayed on the multivision apparatus 5. Therefore, the videos can be moved to a front surface or to a rear surface in terms of video of video group.

According to this preferred embodiment, the multivision system, which displays any videos in a plurality of input videos (video sources) on the multivision apparatus 5, has a function for treating a plurality of input videos as a video group, and calculating the display positions and the video display sizes so that a relative position and a relative size of the video sources belonging to one video group are maintained and the videos are moved or their sizes are changed in terms of video group. Therefore, the plurality of videos obtained by dividing a high resolution source video is input into the multivision processor device 6 that is compatible only with low resolution input and is comparatively inexpensive so that display and arrangement can be changed integrally by a simple operation. This can reduce the cost for construction of a high resolution compatible multivision system, which enables display without deteriorating information included in original videos with high resolution even when input resolution of the multivision processor device 6 is low.

Further, the plurality of video sources (for example, 1920×1080) is not treated as combined one large video source (3840×2160), but is managed as aggregate of the plurality of video sources (video group). Therefore, the multivision processor device 6 may use video sources with small pixel numbers, and an inexpensive multivision processor device can be employed. For example, when a generating section for generating output videos corresponding to four display devices is provided to the multivision processor device 6, and one large video source is treated, a memory according to a large video source is necessary in each of the four generating sections. On the other hand, in this preferred embodiment, only small video sources that should be displayed on the four display devices, respectively, may be used in the generating sections corresponding to the display devices.

This preferred embodiment describes the example where videos obtained by dividing and inputting a high resolution video are classified into groups, but the videos to be classified into groups do not have to be divided videos. For example, when a lot of camera videos are arranged into a lattice pattern, display/non-display is desired to be switched all at once, and a lot of video sources whose input resolution is not uniform are arranged into a lattice pattern as video windows with the same size, these video sources are treated as video groups, so that desired videos can be displayed by less operations.

One set of the control device 7 and the multivision processor device 6 can be understood as a display controller that determines the video display positions and the video display sizes of the plurality of videos on the display devices 1 to 4 based on the group display positions and the group display size of display videos (videos in a video group) on the multivision determined based on the changing operation in the operating section 82, and the relative position, the relative size and the display information obtained from the recording section 84 so that the relative position and the relative size are maintained also in the multivision apparatus 5, and generates video signals corresponding to the display devices 1 to 4 based on the video display positions and the video display sizes so as to output the video signals to the display devices 1 to 4.

<Registration of Video Group>

Figure 33:
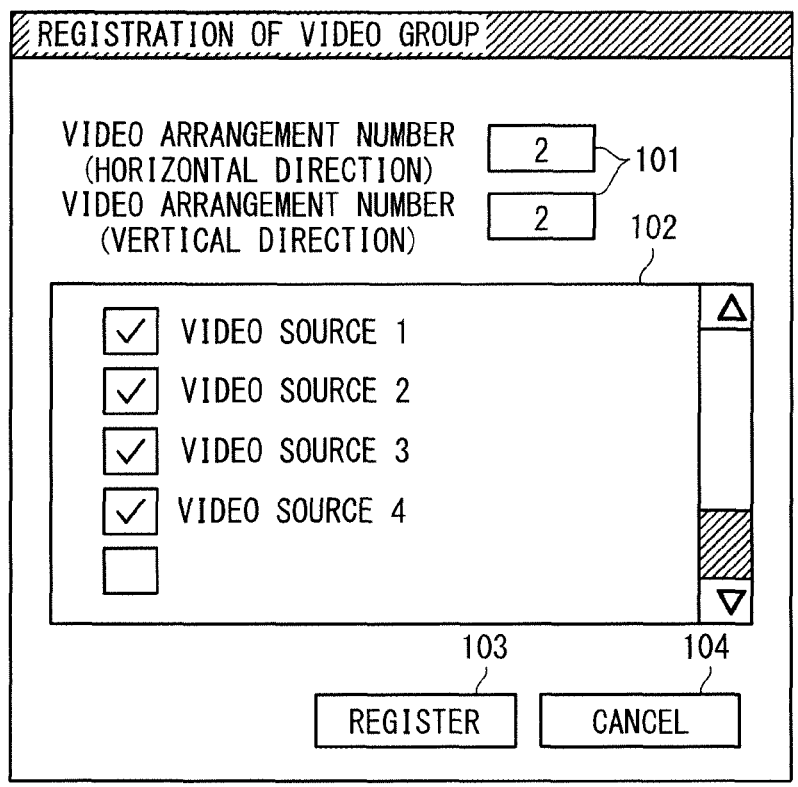
FIG. 33 is a diagram schematically illustrating one example of a video group registration screen.

The operating section 82 may accept an operation for registering a video group. For example, the user performs a predetermined operation in the operating section 82, so that a registration screen is displayed on the display device of the control device 7. FIG. 33 is a diagram illustrating one conceptual example of the registration screen. In an example of FIG. 33, an input frame 101 into which the arrangement number of video sources belonging to a video group is input, a specification frame 102 where a video source belonging to the video group is specified, a registration button 103, and a cancel button 104 are displayed.

The arrangement number of video sources in the horizontal direction, and the arrangement number of video sources in the vertical direction are input into the input frame 101.

A list of video sources to be specifiable is displayed on the specification frame 102, and check boxes corresponding to the video sources are shown. The user clicks a check box so as to be capable of specifying/cancelling the video source.

Further, when the user clicks the registration button 103, the video group including the specified video source is registered. When the user clicks the cancel button 104, the display of the registration screen for the video group is ended.

Further, the video group may be enabled to be edited on an editing screen shown in FIG. 34. For example, FIG. 34 illustrates an input frame 201 into which the arrangement number of video sources belonging to a video group is input, a display frame 202 on which the arrangement of the video sources belonging to the video group is schematically displayed, a display input frame 203 on which the source number of the video source selected from the video sources displayed on the display frame is displayed and into which the source number can be input, a save button 204, and a cancel button 205.

Since the input frame 201 is similar to the input frame 101, repeated description is avoided.

In the example of FIG. 34, four arrangement frames are shown on the display frame 202 in the lattice pattern. The arrangement positions are indicated by coordinates on the respective arrangement frames, and the source numbers of video sources arranged on the arrangement frames are shown. Videos of the video sources may be displayed on the arrangement frames. These arrangement frames can be selected by the user, and the selected arrangement frame is indicated by dotted hatching.

The source number of the video source to be arranged on the selected arrangement frame is shown on the display input frame 203. The user selects the display input frame 203 so as to be capable of inputting the source number into the display input frame 203. As a result, the video source that should be arranged on the arrangement frame can be selected.

When the user clicks the save button 204, the video group including the specified video source is registered. When the user clicks the cancel button 205, the display of the video group on the editing screen is ended.

In this preferred embodiment, the source numbers are allocated to all the source arrangement positions in the video group, but the video sources do not have to be allocated. That is to say, the video group includes video sources whose number is smaller than the source arrangement number, and an arrangement position where no video source is displayed may be present.

In this preferred embodiment, the sizes of video sources belonging to one video group are the same as each other, but as described above, they may be different from each other. In short, while the relative sizes of the video sources belonging to one video group are being maintained, the video of the video group may be displayed on the multivision apparatus 5. This can be realized by taking a relative size into consideration in the calculation of the video display size. For example, when a ratio of the sizes of the source arrangement positions (1, 1) and (1, 2) in the horizontal direction to the sizes of the source arrangement positions (2, 1) and (2, 2) in the horizontal direction is a:b, the video display sizes Sx2 of the video windows PC-1 and PC-3 in the horizontal direction may be calculated according to the following formula (11), and the video display sizes Sx2 of the video windows PC-1 and PC-3 in the horizontal direction may be calculated according to the following formula (12).

$$Sx2 = Sx1 \cdot a/(a+b) \tag{11}$$

$$Sx2 = Sx1 \cdot b/(a+b) \tag{12}$$

While the invention has been shown and described in detail, the foregoing description is in all aspects illustrative and not restrictive. It is therefore understood that numerous modifications and variations can be devised without departing from the scope of the invention.

What is claimed is:

1. A multivision display control device for controlling a multivision device having a plurality of display devices having respective display screens, said display screens forming a multivision screen, said multivision display control device comprising:
   a display controller configured to display a plurality of videos according to video display positions that are respective positions of said display devices and at video display sizes, said plurality of videos foaming a first video group; and
   an operating section configured to receive via user input an operation designating one or both of a group display position that is a singular position of a first display video on said multivision screen and the only position designated by said operation, and a group display size that is a singular size of said first display video and the only size designated by said operation, wherein
   said display controller is further configured to
      automatically modify said video display positions and/or said video display sizes, on the basis of display information including sizes and positions of said plurality of display screens, a relative position and a relative size of said plurality of videos in said first video group, and said one or both of said group display position and said group display size designated by said operation, and without further user input than the designation of said one or both of said group display position and said group display size,
      generate video signals for said plurality of display devices based on said modification to said video display positions and/or said video display sizes, and
      output said video signals to said plurality of display devices,
   said group display position and said group display size are different from said positions and said sizes of said display information respectively, and
   said operating section provides a graphical user interface whereby said plurality of videos are manipulated integrally, such that said operation designates a modified group display position by moving said plurality of videos in parallel across said graphical user interface, and/or said operation designates a modified group display size by enlarging or reducing said plurality of videos in parallel on said graphical user interface.

2. The multivision display control device according to claim 1, wherein said operating section is configured to receive said operation designating said at least one of said group display position and said group display size as a first operation, said operating section is configured to receive also a second operation about whether said first display video is displayed, and said display controller is configured to determine said at least one of said group display position and said group display size of said first display video only when said first display video is displayed based on said second operation.

3. The multivision display control device according to claim 2, wherein said operating section is configured to receive also a third operation for specifying which of said first display video or a second display video is displayed, when at least parts of said first display video and said second display video overlap each other, said second display video being formed by a plurality of videos belonging to second video group, and said display controller is configured to:

(a) determine a group overlapping order representing priorities of said first display video and said second display video to be displayed for said first video group and said second group based on said third operation, when at least parts of said first display video and said second display video overlap each other, (b) determine a source overlapping order representing which of said plurality of videos to be displayed on said display screens is preferentially displayed for each of said display screens based on said group overlapping order, and (c) generate said video signals so that a video of said plurality of videos that has the highest source overlapping order is displayed on an overlapped portion in which said at least parts of said first display video and said second display video overlap each other.

4. The multivision display control device according to claim 1, wherein said relative position and said relative size in said first video group is set so that said plurality of videos are arranged side by side without another video, and said display controller is configured to calculate said video display position and said video display size so that said plurality of videos are displayed side by side without another video.

5. A multivision system comprising:

the multivision display control device according to claim 1; and said multivision device.

6. A multivision display control device for controlling a multivision device having a plurality of display devices having respective display screens, said display screens forming a multivision screen, said multivision display control device comprising:

a display controller configured to display a plurality of videos according to video display positions that are respective positions of said display devices and at video display sizes, said plurality of videos forming a first video group; and an operating section configured to receive an operation designating one or both of a group display position that is a singular position of a first display video on said multivision screen and the only position designated by said operation, and a group display size that is a singular size of said first display video and the only size designated by said operation, said first display video being formed by a plurality of videos belonging to a first video group, wherein said display controller is further configured to automatically modify said video display positions and/or said video display sizes, on the basis of display information including sizes and positions of said plurality of display screens, a relative position and a relative size of said plurality of videos in said first video group, and said one or both of said group display position and said group display size designated by said operation, and without further user input than the designation of said one or both of said group display position and said group display size, generate video signals for said plurality of display devices based on said video modification to said display positions and/or said video display sizes, and output said video signals to said plurality of display devices, said operating section provides a graphical user interface whereby said plurality of videos are manipulated integrally such that said operation is a changing operation for resizing said first display video by resizing said plurality of videos in parallel on said graphical user interface, or said operation is a changing operation for moving said first display video by moving said plurality of videos in parallel across said graphical user interface, said relative position and said relative size in said first video group are set so that said plurality of videos are arranged side by side without another video, said display controller is configured to calculate said video display positions and said video display sizes, based on said first operation, so that said plurality of videos are displayed side by side without another video, when said changing operation is for resizing said first video group, said display controller responds to said changing operation by changing said video display sizes of said plurality of videos in parallel by a same amount designated by said changing operation, when said changing operation is for moving said first video group, said display controller responds to said changing operation by changing said video display positions of said plurality of videos in parallel by a same amount designated by said changing operation, and said group display position and said group display size are different from said positions and said sizes of said display information respectively.

7. The multivision display control device according to claim 1, wherein said operating section is configured to receive said operation performed by a user.

8. A multivision display control device for controlling a multivision device having a plurality of display devices having respective display screens, said display screens forming a multivision screen, said multivision display control device comprising:

an operating section configured to receive a first operation about a group display position that is a position of a first display video on said multivision screen and a group display size that is a size of said first display video, said first display video being formed by a plurality of videos belonging to a first video group;

a display controller configured to determine video display positions that are the positions of said plurality of videos on said display screens and video display sizes that are sizes of said plurality of videos based on said group display position and said group display size, display information including sizes and positions of said plurality of display screens, a relative position and a relative size of said plurality of videos in said first video group, to generate video signals for said plurality of display devices based on said video display positions and said video display sizes, and to output said video signals to said plurality of display devices, wherein said display control section is configured to determine said video display sizes in horizontal and vertical directions on the basis of the following formulas using a ratio of a to b, said ratio being a ratio of sizes Sx1 and Sy1 in said horizontal and vertical directions to said relative size in said horizontal and vertical directions, said sizes Sx1 and Sy1 indicating said group display size in said horizontal and vertical directions:

$Sx2=Sx1 \cdot a/(a+b)$; and $Sy2=Sy1 \cdot b/(a+b)$, and determine said video display positions Px3 and Py3 in said horizontal and vertical directions on the basis of the following formulas using the number of said plurality of videos Nx and Ny in said horizontal and vertical directions, positions Px1 and Py1 indicating said group display position in said horizontal and vertical directions, and display positions Px2 and Py2 on vision in said horizontal and vertical directions, said display positions Px2 and Py2 being display positions of said plurality of videos on said multivision screen in said horizontal and vertical directions:

$Px2=Px1+(Hx-1) \cdot Sx2$;

$Py2=Py1+(Hy-1) \cdot Sy2$;

$Px3=Px2-DPx1$; and $Py3=Py2-DPy1$.

9. The multivision display control device according to claim 8, wherein said operating section is configured to receive said first operation performed by a user.

* * * * *